United States Patent [19]

Powell

[11] 4,442,454
[45] Apr. 10, 1984

[54] IMAGE PROCESSING METHOD USING A BLOCK OVERLAP TRANSFORMATION PROCEDURE

[75] Inventor: Philip G. Powell, Pinner, England

[73] Assignee: Eastman Kodak Company, Rochester, N.Y.

[21] Appl. No.: 441,826

[22] Filed: Nov. 15, 1982

[51] Int. Cl.[3] .............................................. H04N 5/21
[52] U.S. Cl. .................................... 358/167; 358/135
[58] Field of Search ............... 358/167, 166, 163, 135, 358/136, 36, 37, 133

[56] References Cited

U.S. PATENT DOCUMENTS

| | | | |
|---|---|---|---|
| 3,715,477 | 2/1973 | Olson et al. | |
| 3,996,421 | 12/1976 | Pruznick et al. | |
| 4,055,756 | 10/1977 | Jolivet et al. | 364/725 |
| 4,057,828 | 11/1977 | Monahan | 358/32 |
| 4,134,134 | 1/1979 | Lux | 358/280 |
| 4,163,258 | 7/1979 | Ebihara et al. | 358/167 |
| 4,205,341 | 5/1980 | Mitsuya et al. | 358/135 |
| 4,242,705 | 12/1980 | Ebihara | 358/167 |
| 4,245,248 | 1/1981 | Netravali et al. | 358/136 |

OTHER PUBLICATIONS

B. P. Agrawal & V. K. Jain, "Bandwidth Compression of Noisy Images", *Computer and Electronic Engineering*, vol. 2, 1975, pp. 275–284.

H. R. Keshaven et al., "Application of Orthogonal Transforms in Enhancement of Images in the Presence of Additive Noise", *Computer and Electronic Engineering*, vol. 4, 1977, pp. 279–295.

J. S. Lim, "Image Restoration by Short Space Spectral Subtraction", *IEEE Transactions on Acoustics, Speech, and Signal Processing*, vol. ASSP-28, No. 2, 480, pp. 191–197.

H. Nawab et al., "Improved Spectral Subtraction for Signal Restoration," *Proceedings of the 1981 IEEE International Conference on Acoustics, Speech and Signal Processing*, vol. 3, 1981, pp. 1105–1108.

W. Q. Nicholson & K. S. Davis, "The Binomial Window", SPIE, vol. 238, *Image Processing for Missile Guidance*, pp. 467–479.

P. A. Wintz, "Transform Picture Coding," *Proceedings of the IEEE*, vol. 60, No. 7, Jul. 1972, pp. 809–820.

Primary Examiner—Richard Murray
Attorney, Agent, or Firm—David M. Woods

[57] ABSTRACT

An image processing method is provided for reducing noise in a sampled image, particularly for reducing noise in an image divided into blocks of sampled image elements that are transformed by a linear procedure, such as the Walsh-Hadamard transform, and improved regarding visible noise by non-linear thresholding of the transform coefficients. By operating the process in a hierarchy of stages, each stage employing a block operating on image signals derived from a preceding stage, and by overlapping the blocks processed in each stage, the processed signal from each image element is the linear combination of many transform coefficients from each stage and from each overlapped block within each stage. Such a large number of contributions making up each processed image element assures that the processed image is generated without a characteristic block-like structure due to block transform processing while the wanted components of the image are rendered with minimal image loss or distortion.

8 Claims, 30 Drawing Figures

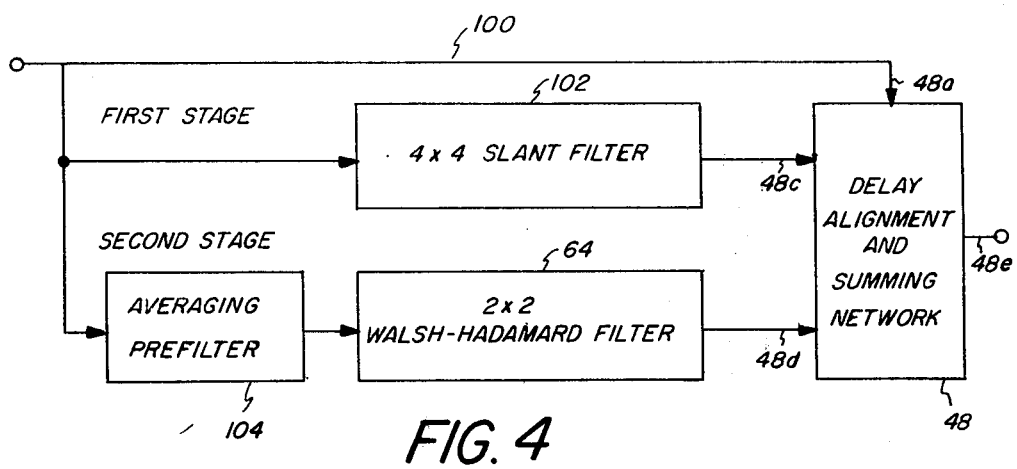

FIG. 4

2 by 2 BLOCK
OF IMAGE
SIGNALS

| d | c |
|---|---|
| b | a |

WALSH-HADAMARD OPERATORS $$H1 = \begin{bmatrix} 1 & 1 \\ 1 & 1 \end{bmatrix} \quad H2 = \begin{bmatrix} 1 & -1 \\ 1 & -1 \end{bmatrix} \quad H3 = \begin{bmatrix} 1 & 1 \\ -1 & -1 \end{bmatrix} \quad H4 = \begin{bmatrix} 1 & -1 \\ -1 & 1 \end{bmatrix}$$

DIRECT WALSH-
HADAMARD OPERATIONS $H1 = d + c + b + a$ $H2 = d - c + b - a$ $H3 = d + c - b - a$ $H4 = d - c - b + a$

INVERSE WALSH-HADAMARD OPERATIONS $d = (H1 + H2 + H3 + H4)/4$ $c = (H1 - H2 + H3 - H4)/4$ $b = (H1 + H2 - H3 - H4)/4$ $a = (H1 - H2 - H3 + H4)/4$

FIG. 5

IMAGE PROCESSING METHOD USING A BLOCK OVERLAP TRANSFORMATION PROCEDURE

BACKGROUND OF THE INVENTION

1. Field of the Invention

The invention relates to image processing methods for reducing noise in a sampled image. More specifically, the invention pertains to such methods in which an image is divided into blocks of sampled image elements which are transformed according to a linear transform procedure.

2. Description Relative to the Prior Art

Known image processing apparatus commonly uses two kinds of methods for reducing noise in a sampled representation of an image: (1) one kind of method based on a point-neighborhood process and (2) another kind of method based on a transform process. In both kinds of methods, every sampled image value is replaced by a modified value, based on the image values within a surrounding field of image elements. The values within the surrounding field are used to form a number of different linear combinations each of which represents a different component of the image structure within the field, and most of which represent the detail within the field. Each detail-sensitive combination represents a difference among local image values and tends to vanish in the absence of a particular kind of image detail. Noise is reduced by modifying the detail-sensitive combinations such that, for example, the value of a combination is lowered or set to zero whenever a particular kind of image detail is not present to a significant degree.

Point-neighborhood processes consider the value of each original element separately in combination with the values in a small neighborhood of surrounding elements. These processes reconsitute the image by replacing the value of each original image element by the sum of a number of linear combinations of the neighborhood values.

Transform processes may use instead of a small neighborhood the whole array of sampled image values, as described by Agrawal and Jain, (in "Bandwidth Compression of Noisy Images," *Computer and Electronic Engineering*, Vol. 2, 1975, pp. 275-284) and Keshavan et al (in "Application of Orthogonal Transforms in the Enhancement of Images in the Presence of Additive Noise," *Computer and Electronic Engineering*, Vol. 4, 1977, pp. 279-295). In a transform process, the original image is represented by a combination of predetermined patterns (i.e., functions). Each pattern is numerically weighted by a transform coefficient calculated from a linear combination of the image values. The magnitude of each transform coefficient indicates the contribution of the corresponding pattern to the original image. The transform coefficients of all of these patterns thus constitute the original image in its transformed condition. The image (in its original condition) may be recovered by replacing the image value of each element by a different linear combination of the transform coefficients.

In both point-neighborhood and transform processes noise is reduced by modifying the detail-sensitive linear combinations of the image values. Since the noise modification process involves the application of a non-linear function, some distortion of local image values (i.e., an artifact of the processing itself) may be generated which affects the wanted image and the residue of unwanted noise, but this is tolerated in order to realize the desired noise reduction.

For a typical image, a transform process carries out direct and inverse transform computations on a large array of data. In the case of data compression by a transform process, Wintz (in "Transform Picture Coding," *Proceedings of the IEEE*, Vol. 60, No. 7, July 1972, pp. 809-820) describes dividing the image into adjacent blocks of image elements in order to simplify coding for image transmission. Division of the image into blocks faacilitates processing not only for image coding, but also for noise reduction. Processing each block independently for noise reduction reduces the computation load and the problem of managing large arrays of data. The total number of transform coefficients to be generated for later modification is reduced only slightly, but each one involves less computation.

Unfortunately, there is also a disadvantage associated with dividing the image into blocks. After modification and inverse transformation, a boundary may exist between adjacent blocks. These boundaries may lead to a checkerboard appearance in the reconstituted image, acceptable in some applications, but unacceptable for high quality image reproduction. Nicholson and Davis (in "The Binomial Window", SPIE Vol. 238, *Image Processing for Missile Guidance*, pp. 467-479) say that this defect can be reduced by multiple runs of the block process over the image, incrementing the block address between runs so as to provide block/block overlap. They point out, however, that computational cost (or time) usually limits block processing practice to adjacent, non-overlapping image blocks.

The selection of the block size in a block transform process intended for noise reduction must be considered carefully. If the block size is too small, noise components of low spatial frequency will remain unchaanged after modification of the coefficients and may result in a residual mottled appearance. In some applications involving images of moderate quality and spatial resolution, a small block, containing relatively few elements, provides an adequate degree of noise reduction. Such an application is described by Ebihara (U.S. Pat. No. 4,163,258). In these cases, the technique of multiple runs with block overlap, as proposed by Nicholson and Davis, will solve the block boundary problem without requiring excessive computation. In other applications involving images of higher quality, however, a large block, containing a relatively large number of elements, is needed to suppress mottle. Using such a block not only increases the computation load, especially if overlap is used, but also degrades high-frequency detail that is confined to a small area within the block.

For these reasons, it is better for purposes of noise reduction to process the image with several block sizes and to use overlap to avoid the appearance of checkerboard patterns. Depending on the method adopted, demands on computational time and capacity may be excessive. In the case of an image coding system, Lux (U.S. Pat. No. 4,134,134) has proposed reducing the computational load by processing in a series of stages, as follows. In the first stage, the image is divided into blocks, and each of these blocks is transformed. One coefficient of each transformed block represents the average within that block. At the second stage, these average coefficients are employed to form a reduced image derived from the block averages in the previous stage. That reduced image is divided into blocks, each is transformed, and the coefficients representing averages are used to form a still further reduced image. Since the number of blocks in the first stage is less than the number of elements in the first stage, the second stage requires considerably less computation than the first. Subsequent stages can be implemented with less and less additional computation.

For the purpose of noise reduction, which was not considered by Lux, such a multi-stage procedure has the advantage of processing with several block sizes. Small blocks, containing only a few local picture elements, are used for processing high-spatial frequencies, while large blocks, containing averages from the small blocks and representative of many picture elements, are used for processing low-spatial frequencies. Local areas of high-frequency image detail are now represented by only a few coefficients generated in relation to the small blocks which contain that detail. This allows more of the high-frequency noise in other areas to be removed without degrading high frequency image detail in those blocks in which it occurs. Furthermore, while Lux does not suggest overlap, operating in stages reduces the computational load so that overlapping of blocks becomes practical. This overlap reduces the visibility of block boundaries.

The method in accordance with the invention utilizes the combination of a block overlap transform process and a multi-stage procedure to overcome the problem of boundary visibility in an image processing method intended for noise reduction. Besides reducing the amount of processing to a manageable level while still using several block sizes, this combined solution to the problem of block visibility has another advantage. In order to understand this advantage, consider first the case of a multi-stage procedure with non-overlapping boundaries. Each image element falls into one block of each size. The value of each image element after processing is the linear combination of (1) the modified detail-sensitive transform coefficients from one block of every stage, and (2) the average value from one block of the largest size of the series. In contrast, in the case of a multi-stage procedure with overlap, the value of each element after processing and averaging over the multiple runs depending on a much larger number of coefficients. These coefficients are (1) the modified detail-sensitive transform coefficients from every block that overlaps that element at every stage and (2) the average values from all of the largest blocks that overlap that element. The actual number of contributions depends on the number of stages, the size of the transform block at each stage and the amount of overlap employed at each stage. The values of corresponding coefficients from all of the blocks overlapping each element will be different, and each will be modified differently by the non-linear noise reduction process. As explained earlier, the local distortion (i.e., artifact) associated with this non-linear modification affects the wanted image component and the residue of unwanted noise component. However, averaging over a large number of overlapped partial images, as prescribed by the invention in order to reduce block visibility, also reduces the visibility of the artifacts in both components of the image, thus improving the effective noise reduction performance.

SUMMARY OF THE INVENTION

In accordance with the invention, a multi-stage method based on block/block overlap is provided for processing an original image in order to generate a processed image having fewer unwanted components, such as noise, than the original image, but without generating a characteristic block-like structure due to block transform processing. In addition, the wanted components of the image are rendered with less image loss or distortion than would occur if the blocks were adjacent one another. Furthermore, the residue of unwanted noise components due to non-linear processing is reduced. The method employs a multi-stage procedure that operates on image signals related to respective elements of the original image, as follows. The image signals are grouped into arrays of image signals corresponding to overlapping blocks of image elements, each block including at least one image element in common with at least one other block. These aligned arrays are processed in a hierarchy of separate stages in which the image signals generated for each stage subsequent to the first represent derived signals responsive to combinations of image signals from some preceding stage. Within each stage, each array of image signals is transformed by a set of independent functions into a corresponding set of coefficient signals representing combinations of image signals corresponding to general brightness and image detail. Certain coefficient signals are modified in order to minimize the unwanted components in the processed image. A processed image is then generated from the many sets of coefficient signals, some of which were modified in the preceding step.

The derived image signals generated for each stage subsequent to the first may be formed in a number of ways. As an example, the derived image signals may comprise the coefficient signals representing an estimate of general brightness within each block of the preceding stage. As another example, such image signals may be derived by filtering the image signals processed in a preceding stage in order to provide filtered image signals representing general brightness within areas of the image as processed in that preceding stage.

The step of modifying coefficient signals may also be implemented in several ways. One such implementation, hereinafter referred to as "coring and adding", involves the use of a threshold (or a set of thresholds corresponding to the set of coefficient signals) that represents a coefficient magnitude greater than that expected to occur due to noise (i.e., meaning that greater coefficient magnitudes rarely occur due to noise alone), the selection of coefficient signals that are smaller in magnitude than this threshold(s), the alteration of these selected coefficient signals by reducing their values, and the generation of a processed image by adding the sum of the image signals derived from the modified and unmodified coefficients to an image signal representing the general brightness of the image. Another implementation, hereinafter referred to as 'clipping and subtracting', involves the selection of coefficient signals that are greater in magnitude than the threshold(s), the modification of these selected coefficient signals by reducing their values, and the generation of a processed image by subtracting the sum of the image signals derived from the modified and unmodifed coefficients from a full-band image signal representative of the original image.

BRIEF DESCRIPTION OF THE DRAWINGS

The invention will be described with reference to the figures, wherein:

FIG. 4 is a block diagram illustrating a two-stage, overlapped block transform method in accordance with a third embodiment of the invention;

FIG. 5 is a diagram explaining the Walsh-Hadamard operations employed on a 2 by 2 array of image signals;

DETAILED DESCRIPTION OF THE PREFERRED EMBODIMENTS

The input signal in the following description is generated by the scanning and sampling of an original image. For purposes of describing the preferred embodiments the input signal is assumed to be generated from an image such as a negative or positive photographic transparency. It is further understood that such a signal may represent a variety of spatial components of the image, including an average brightness level, fine detail such as fine lines and textures, intermediate detail such as small features, and coarse detail such as shaded modeling and other gradually varying features. (Modeling as here used refers to the rendition of smoothly varying features or details.) In addition, the signal includes a noise component affecting most of the spatial components to some degree. With a photographic transparency, much of such noise originates with the random distribution of the light-absorbing particles that form the basis of this image-recording system. While the invention will be described in connection with sampled data from a photographic transparency, it should be understood that the input signal can represent other information or data, such as would be derived from directly scanning an object, from a composite video signal, or from image information in optical/electrical/magnetic storage. In such cases the noise originates in other characteristics of the signal generating system.

Figure 1:
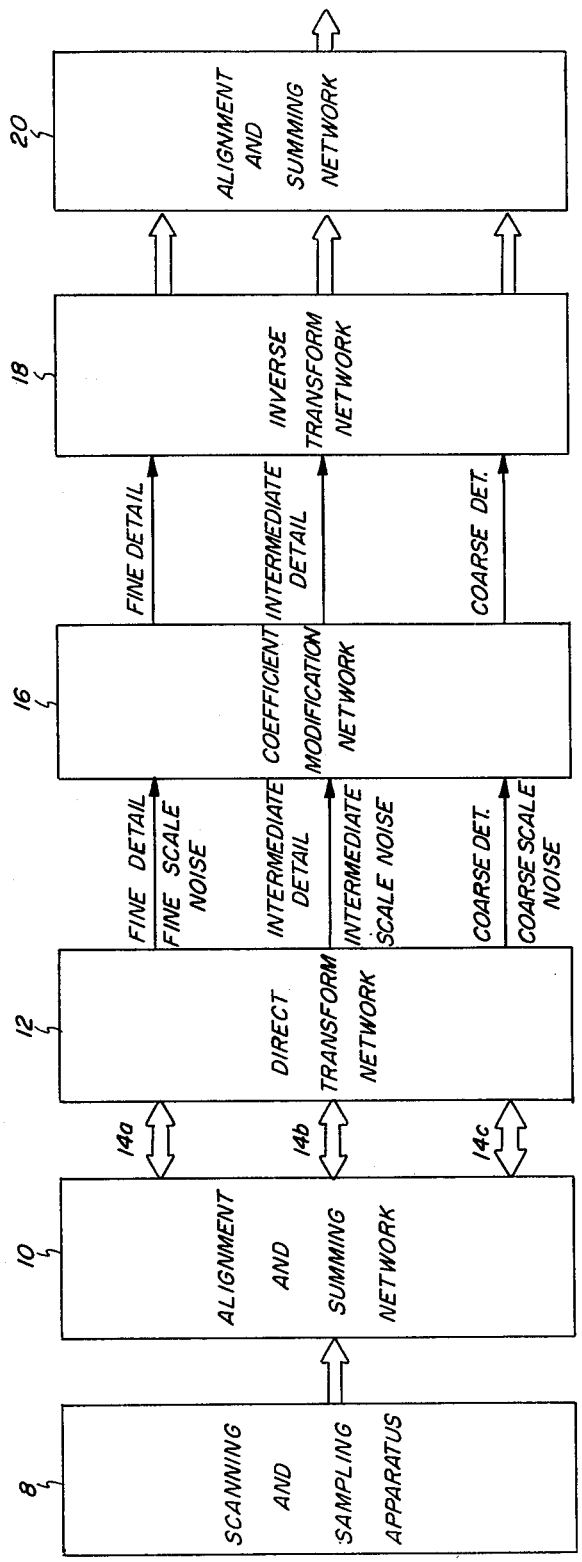
FIG. 1 is a block diagram of the major features of a block transform method for reducing noise in an image in accordance with the invention.

FIG. 1 is a diagram of the major components of apparatus for implementing an overlapped block transform noise reduction method in three stages in accordance with the invention. While three stages are described in connection with FIG. 1, two stages or more than three stages may be used in accordance with the invention. Each stage is capable of processing a different block size. Image signals related to the brightness values of respective elements of an original image are generated by a scanning and sampling apparatus 8. A sequence of signals representing these elements of the sampled image are presented to an alignment and summing network 10 as a stream of successive image signals. The alignment and summing network 10 (1) groups a set of image signals selected from this sequence so as to form a two-dimensional array corresponding to a block of image elements suitable for block transformation (2) provides such image signal arrays of selected sizes for processing in a hierarchy of respective stages each of which is orderly related to the preceding stage (3) implements appropriate low-pass prefiltering of the signals provided to the respective arrays and (4) provides a continuous stream of such arrays corresponding to overlapping blocks of image elements, each displaced by at least one image element with respect to the preceding block. Each stage includes a channel for conveying signals sensitive to particular spatial components of the image: the first stage conveys fine detail signals in channel 14a, the second stage conveys intermediate detail signals in channel 14b and the third stage conveys coarse detail signals in channel 14c. Noise signals, due to photographic grain, are distributed across all channels, the spatial scale of the noise signals in each channel corresponding to the spatial scale of the corresponding detail.

Figure 6:
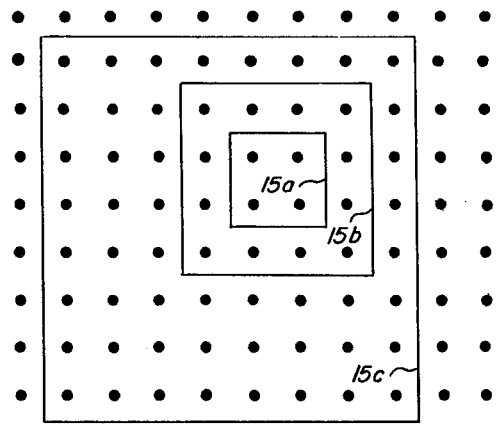
FIG. 6 illustrates the mapping of image elements into differently-sized blocks.

To illustrate the principles involved, FIG. 6 shows an image field in which the image elements are mapped into three differently-sized blocks 15a, 15b and 15c (shown to be concentric for purposes of illustration only). The image signals corresponding to these elements may be the original image signals generated by apparatus 8 or they may be derived signals generated by filtering or processing in some other way. Block 15a (2 by 2) corresponds to the array of image signals processed through the first stage fine detail channel 14a, block 15b (4 by 4) corresponds to signals processed through the second stage intermediate detail channel 14b; and block 15c (8 by 8) to signals processed through the third stage coarse detail channel 14c. In order for the array corresponding to block 15b to represent intermediate detail and for the array corresponding to block 15c to represent coarse detail, each element of these arrays represents an average over a respective block of input image signals (equivalent to low-pass prefiltering these signals). This is effected by the alignment and summing network 10. The block 15a shown in FIG. 6 is a 2 by 2 block, but it is understood that this is for illustration only and it may be larger. It is also understood that the size of the blocks 15b and 15c may be other than as illustrated and that their positions as shown only represent examples corresponding to arrays that occur as the sequence of image signals stream through the network 10.

Figure 7A:
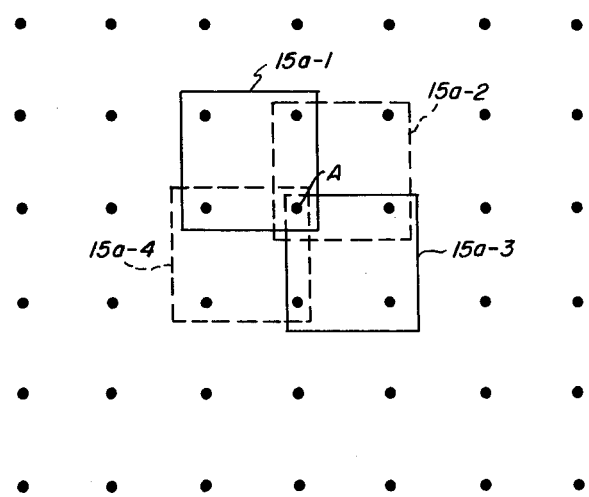
FIGS. 7A and 7B are diagrams that are helpful in understanding block/block overlap in the case of 2 by 2 and 4 by 4 blocks, respectively.
Figure 7B:
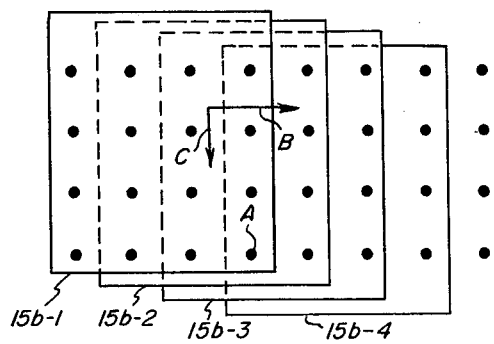

The continuous stream of such signals (grouped as arrays) provided by the network 10 effects a shifting of block boundary locations between displaced blocks generated in each channel to cause block/block overlap. In FIG. 7a, the block 15a is shown in the various displaced locations 15a-1, 15a-2, 15a-3 and 15a-4 that reference image element A. It is seen that image element A (and all other elements in turn) provides contributions (four in the case of a 2 by 2 block) to multiple arrays in the fine detail channel 14a. Similarly, the 4 by 4 block 15b is effectively shifted in each direction by increments of one picture element so that image element A provides contributions to multiple arrays in the channel 14b. FIG. 7b shows four positions of the block 15b, shifted in one direction B and overlying a row of image elements including element A. This positioning of the block 15b is further repeated (but not shown to preserve clarity) four times in direction C for the four possible combinations of four rows that could overlap element A, leading to contributions provided by element A to a total of sixteen arrays in the channel 14b. Likewise, block/block overlap of 8 by 8 block 15c is seen by a similar analysis to provide contributions by element A to sixty four arrays in the channel 14c. The foregoing discussion of block/block overlap presumes that each block is shifted from the previous block by one image element. It should be understood that for blocks greater than 2 by 2 the shift may be other than a single image element, thereby affecting the number of transformation contributions made by each image element.

Referring again to FIG. 1, the image signals constituting the two-dimensional array for each stage are applied to direct transform network 12, which implements a two-dimensional linear transformation. Numerous known transformations may be implemented by this network, including (but not to be limited to) the Fourier, cosine, sine, Walsh-Hadamard, Haar, slant or Karhunen-Loeve transforms. These transforms are conventional and well known to those of ordinary skill in this art. For further information, reference is made to *Digital Image Processing* by W. K. Pratt (John Wiley & Sons, New York, 1978) and especially chapter 10, "Two-Dimensional Unitary Transforms" and the bibliographic references cited therein. It is to be understood that every stage does not necessarily employ the same transform. The following embodiments will be described in connection with the slant and Walsh-Hadamard transforms.

Each of these transforms consists of a set of operators defined as functions on the values in a block of data, such that after transformation each data value in the block is replaced by a transform coefficient. The operators are conventionally represented as matrices of multiplying factors to be applied in a summation over a corresponding matrix of data. In that connection, FIG. 5 is helpful in understanding the arithmetic operations employed with a 2 by 2 array of image signals for each of the four Walsh-Hadamard operations. The Walsh-Hadamard operators specify the matrices of multiplying factors (which are either $-1$ or $+1$) to be applied in a summation over a 2 by 2 block of image signals; for example the matrix of the H1 operator specifies that the values of all signals in the block are added together while the matrix of the H2 operator specifies that the values in the right column are subtracted from the values in the left column, and so on. It is important to note that these data matrices should not necessarily be taken to correspond spatially to a block of original image elements. For example, while the 2 by 2 block of image elements 15a can be mapped element by element to the 2×2 transform operators shown in FIG. 5, a 2 by 2 transform can also be applied to the 4 by 4 block 15b by selecting the image signal values of alternate elements from alternate rows to form a 2 by 2 data array for transformation. Similarly for the 8 by 8 block 15c, a 2 by 2 transform can be applied by taking the signal values from every fourth element of every fourth row to form a 2 by 2 data array for transformation. It should also be noted that because the elements of blocks 15b and 15c carry derived signals representing averages over respective blocks of input image signals, the derived signal values selected for the respective data arrays also represent contributions from other of the input image elements of blocks 15b and 15c (whose derived values were not selected for this particular transformation). Although this description refers to particular sizes of image element blocks and transform arrays, it is understood that the same considerations apply to other sizes.

Each array of image signals is transformed by a set of independent functions, determined by the choice of transform, into a corresponding set of coefficient signals representing combinations of image signals representative of general brightness and image detail within each block. Some of these coefficient signals will be affected by spatial variations representative of noise components. The transform coefficient signals for each stage are applied to a coefficient modification network 16. This network employs a set of threshold criteria to establish when the respective coefficient signals are mainly representative of noise and carry little or no picture information. The threshold magnitudes are selected to be higher than the transform coefficient magnitudes expected to occur due to noise (i.e., meaning that greater coefficient magnitudes rarely occur due to noise alone). Coefficient signals in each of the three channels 14a, 14b and 14c are evaluated against respective threshold criteria and accordingly modified; for example, each coefficient is set to zero where the coefficient magnitude is less than the corresponding threshold magnitude.

Modified coefficient signals in each of the three channels 14a, 14b and 14c are applied to inverse transform network 18. As the coefficient signals provided by network 16 refer to complete arrays of image signals (corresponding to blocks of image elements), the network 18 provides for each channel a set of modified image signals corresponding to the block size employed in that channel. The network 18 generates these modified image signals from linear combinations of the modified transform coefficient signals. As there are three channels involved in the system of FIG. 1, the network 18 provides three separate sets of linear combinations corresponding to the three block sizes employed in these channels. Furthermore, as the sequence of image signals stream through network 18, each of these three sets of linear combinations provide a number of linear combinations pertaining to each image element and corresponding to all of the overlapped positions of each block that include the image element. All alignment and summing network 20 assembles, accumulates and averages all of these partial contributions pertaining to each image element. In effect the network 20 replaces the value of each original image element put into the system of FIG. 1 with the sum of numerous partial image contributions provided by the inverse transform network 18. The output of network 20 comprises a stream of reconstituted image signals available for further processing.

Figure 2:
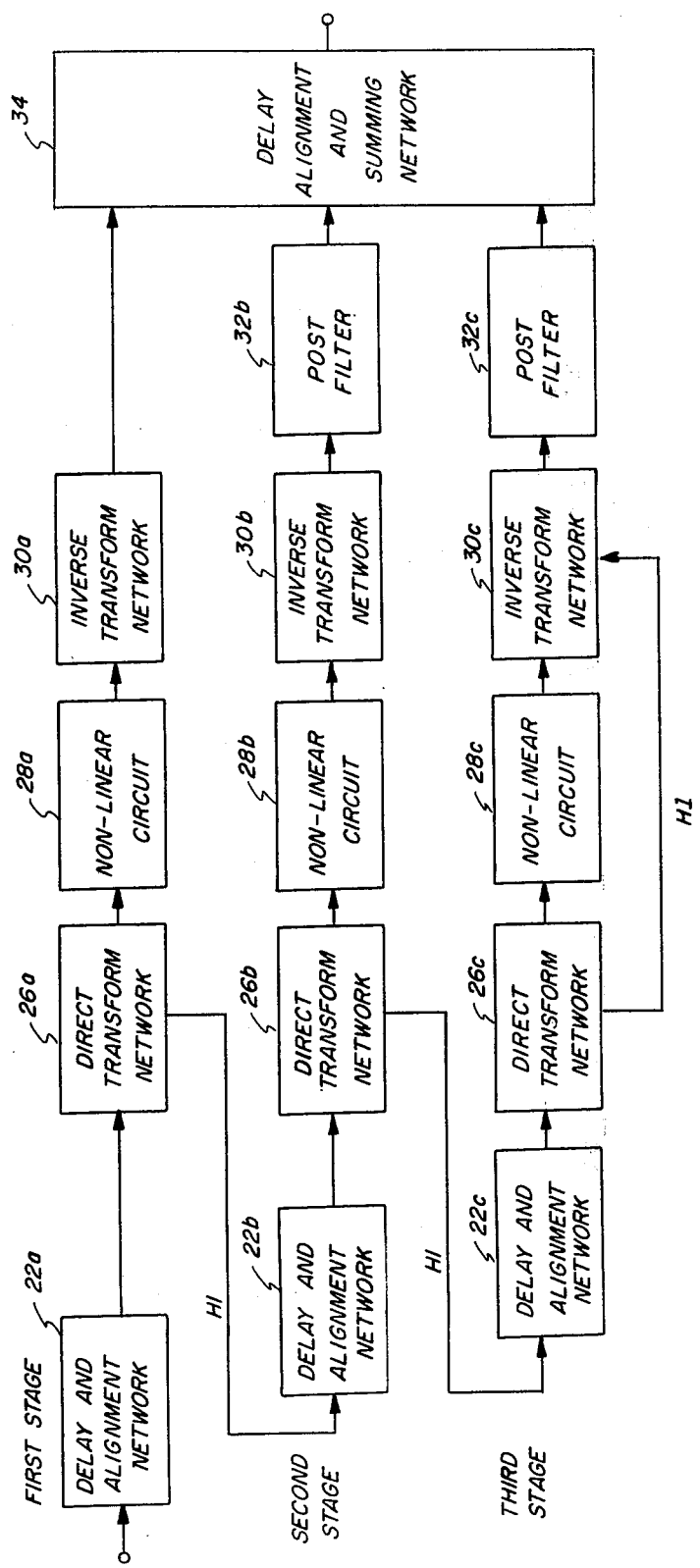
FIG. 2 is a block diagram illustrating a three-stage, overlapped block transform method in accordance with a first embodiment of the invention.
Figure 3:
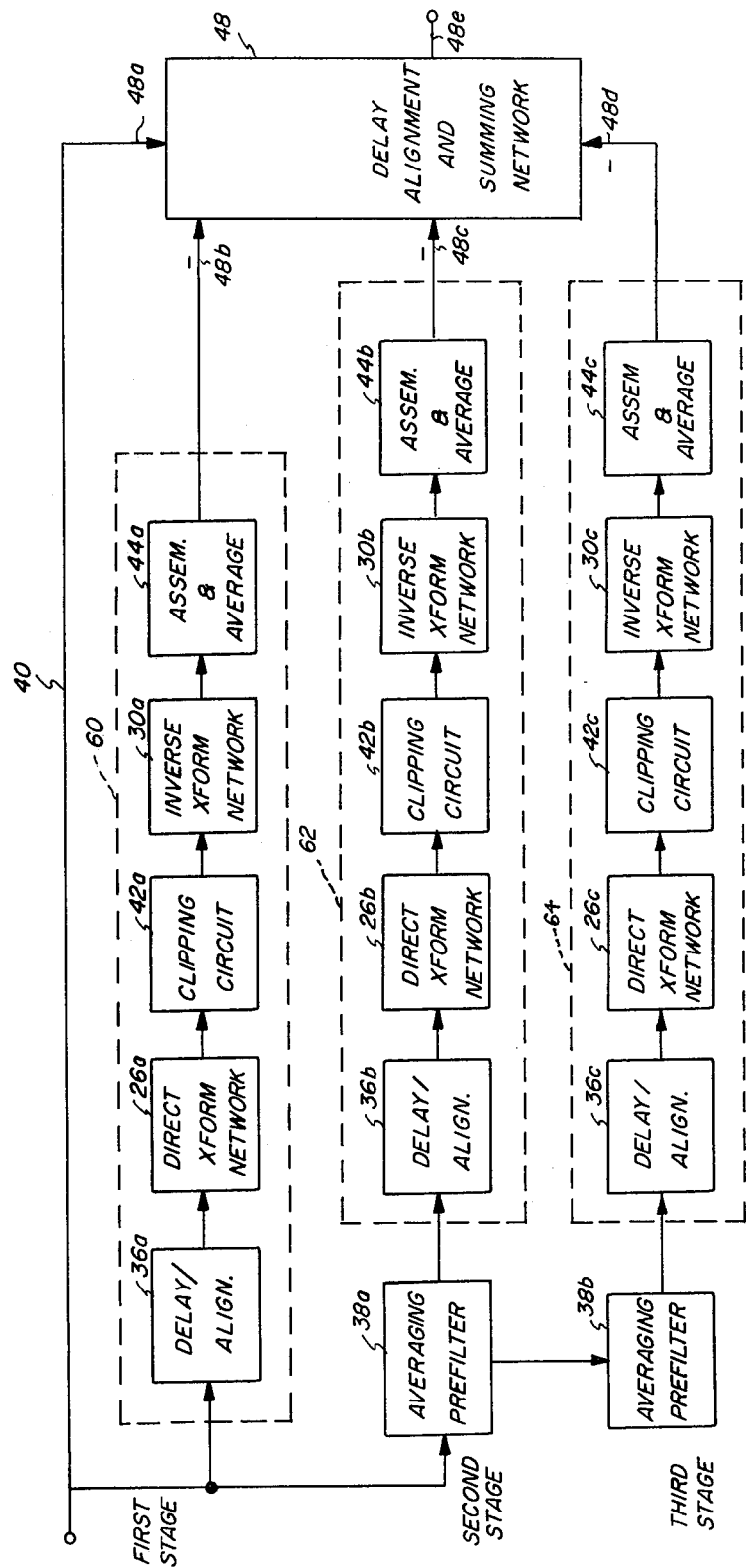
FIG. 3 is a block diagram illustrating a three-stage, overlapped block transform method in accordance with a second embodiment of the invention.
Figure 10:
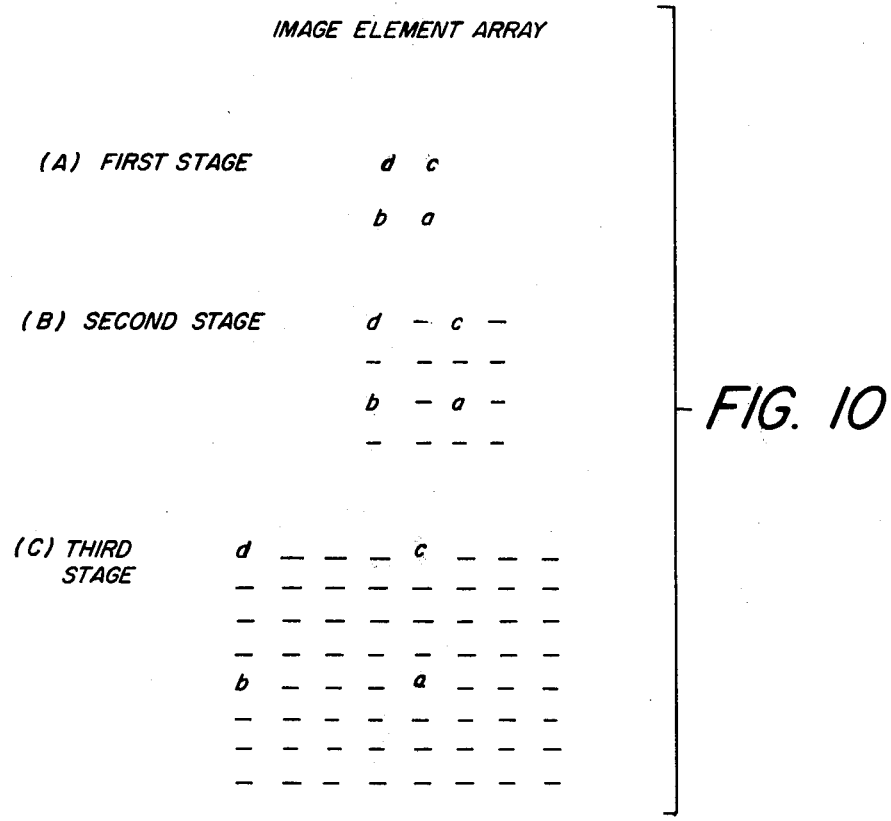
FIGS. 10A, 10B and 10C are diagrams illustrating the particular image element locations selected for transformation at each stage of the method, particularly in accordance with the embodiments of FIGS. 2 and 3.

FIGS. 2 and 3 are diagrams of two apparatus configurations for implementing the multi-stage, overlapped block transform method in accordance with the invention. By way of example, 2 by 2 Walsh-Hadamard transform operators are used in each of the three stages shown in FIGS. 2 and 3. If 2 by 2 transform operators are to be employed at each stage to process differently scaled detail, the image signals generated for each stage after the first are filtered or processed versions of either the original image signals or those signals processed in some preceding stage. Although only four image signals are being transformed at one time, the spatial relationship of the corresponding image elements processed by the Walsh-Hadamard operators, i.e., whether they are adjacent or separated by intervening image elements, will depend on which stage is being referenced. FIG. 10 illustrates the particular image element locations selected for Walsh-Hadamard transformation at each stage. The letters a, b, c, and d represent the locations of the image array elements selected to form the 2 by 2 transformation blocks at each stage, while the dashes represent image elements that do not provide inputs to the respective calculation. The selection of four image signals for transformation at each stage means that each image signal in each stage contributes to the transformation of four arrays of image signals. However, since each image signal in any stage after the first is a filtered version of some preceding image signal, the four image element locations selected for transformation in such stages already include contributions from neighboring locations due to the filtering process.

FIGS. 2 and 3 show alternative embodiments of the alignment and summing networks 10 and 20. In each configuration, the alignment and summing networks provide time-wise alignment of a stream of input image signals so as to present a set of image signals as a two-dimensional array suitable for block transformation and then to provide a corresponding time-wise realignment after inverse transformation so as to reform a stream of modified image signals. In the case of FIG. 2, operating in stages is implemented by using the H1 transform coefficient signal (the signal generated by use of the operator H1). The H1 coefficient signal represents an average brightness over a 2 by 2 block and forms a low-pass prefiltered image for the next stage of the process. This function, described earlier with respect to alignment and summing network 10 of FIG. 1, is carried out by blocks 26a, 26b and 26c of FIG. 2. In the first stage the input image signals are suitably delayed and aligned in delay and alignment network 22a to form a 2 by 2 array of image signals which are obtained from the original image, and which are presented to a direct transform network 26a for transformation. The first stage thus operates on an image divided into small blocks 15a, shown in FIG. 6. Each H1 coefficient signal in this first stage represents the average over a 2 by 2 block of image elements forming a first low-pass signal, and is applied to a delay and alignment network 22b in the second stage. The remaining H2, H3 and H4 coefficient signals generated by network 26a together represent a high-pass filter and provide signals for further processing in the first stage by networks 28a and 30a.

The network 22b then suitably delays and aligns the H1 coefficient signals from the first stage so as to provide the particular elements of the array (corresponding to FIG. 10(B)) selected for Walsh-Hadamard transformation in the second stage and to present this array of selected elements to direct transform network 26b for transformation in the second stage. By this means the second stage operates the 2 by 2 Walsh-Hadamard transform (described in FIG. 5) on selected elements from the 4 by 4 array corresponding to block 15b, each element representing the average over a 2 by 2 block of original image elements. Each H1 coefficient signal in this second stage represents the average over a 4 by 4 block of image elements, forming a second low-pass signal, and is applied to a delay and alignment network 22c in the third stage. The remaining H2, H3 and H4 coefficient signals generated by network 26b together represent a high-pass filter operating on the low-pass signal from the first stage, and so provide a first band-pass signal for further processing in the second stage by networks 28b and 30b. The network 22c then suitably delays and aligns the H1 coefficient signals from the second stage so as to provide the elements of the array (corresponding to the FIG. 10(C)) selected for the Walsh-Hadamard transformation in the third stage and to present this array of selected elements to direct transform network 26c for transformation in the third stage. The third stage thereby operates the 2 by 2 Walsh-Hadamard transform (described in FIG. 5) on the 8 by 8 array corresponding to the block 15c, each element of which represents the average over a 4 by 4 block of image elements. Each H1 coefficient signal in this third stage represents the average over an 8 by 8 block of image elements and forms a third low pass signal. The remaining H2, H3 and H4 coefficient signals generated by network 26c together represent a high-pass filter operating on the low-pass signal from the second stage, and so provide a second band-pass signal for further processing in the third stage by networks 28c and 30c.

The H2, H3 and H4 transform coefficient signals generated in each stage are processed in non-linear coefficient modification circuits 28a, 28b and 28c prior to eventual recombination. Each of these circuits operate to reduce noise as described in connection with the coefficient modification network 16 of FIG. 1. In this embodiment of the invention those coefficient signals that are smaller than the respective thresholds are set to zero, a process sometimes referred to as coring. The H1 coefficient signals formed in the third stage are output to the inverse transform network 30c, bypassing the non-linear circuit 28c. These coefficients represent a low-pass filter and so provide an unmodified low pass signal for eventual recombination with the high-pass and bandpass signals. The inverse Walsh-Hadamard transform networks 30a, 30b and 30c provide modified image signals in each channel; the modified image signals are generated from linear combinations of the modified transform coefficient signals as described in connection with the transform network 18 of FIG. 1. Since the Walsh-Hadamard transform is exactly invertible and employs the same inverse operators as direct operators (except for a gain factor), the operators of FIG. 5 are applied to the inverse transformation, together with an appropriate scaling factor.

Figure 8:
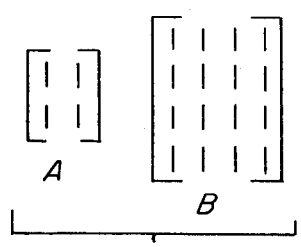
FIGS. 8A and 8B are diagrams of the weighting patterns used for the postfilters of FIG. 2.

Postfilters 32b and 32c are employed to operate on the modified image signals in the second and third stages to interpolate the bandpass image signals and to provide image signals corresponding to every element of the larger arrays corresponding to blocks 15b and 15c respectively as shown in FIG. 6. The weighting patterns of FIGS. 8A and 8B are used as low pass coefficients for the filters 32b and 32c respectively. The reconstituted image signals of the first stage and the reconstituted and interpolated signals of the second and third stages are applied to a delay, alignment and summing network 34 which, with appropriate time alignment, assembles, accumulates and averages the partial contributions pertaining to each image element.

Turning again to FIG. 3, several changes are noted with respect to the version described in the preceding diagram. FIG. 3 incorporates a clipping and subtracting mode of noise isolation and signal recombination, rather than the coring and adding mode (described in connection with FIG. 2), which reduces noise in each channel and sums the remaining signals. In the version of FIG. 3, the incoming full-band image signal is passed without modification on a line 40 to an input port 48a of a delay, alignment and summing network 48. Meanwhile the image-related higher frequency components of the signals in each of the three stages (represented by the H2, H3 and H4 coefficient signals) are directed to non-linear coefficient modification circuits 42a, b and c. Each of these circuits operates so as to leave all coefficient signals smaller than the respective thresholds unchanged, and set to zero any coefficient signals larger than this. The low-pass average signal (the H1 coefficient signal) is unused and set to zero in each of these stages. The low amplitude, higher frequency signals are passed through respective input ports 48b, 48c and 48d to the network 48 where they are aligned and summed so as to constitute a noise estimate, which is subtracted from the unmodified full-band signal. The processed output signal is provided at an output port 48e.

Figure 9:
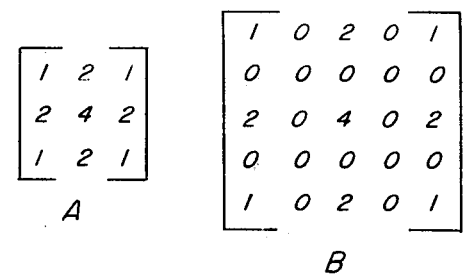
FIGS. 9A and 9B are diagrams of the weighting patterns used for the prefilters of FIG. 3.

FIG. 3 also incorporates a second modification to the earlier diagram. Suitably low-pass prefiltered image signals related to the average brightness of areas of the original image are provided in the second and third stages by use of averaging prefilters 38a and 38b rather than by assembling the average transform coefficients of the preceding stage, as in FIG. 2. Furthermore, the prefiltering includes not only the averaging over a 2 by 2 block leading to the H1 coefficient signal of FIG. 2, but also the steps included in the post-filter of FIG. 2, now carried out before noise reduction instead of afterward. In the first stage, a stream of input image signals are applied to a delay and alignment network 36a, which presents an array of image signals to the transform network 26a for transformation in the first stage (channel 14a). The input image signals are also presented in the second stage to the averaging prefilter 38a, in which each image signal of the original image is replaced by an average over a neighborhood of the original image signal in accordance with the weighting pattern of FIG. 9A. This stream of once-averaged image signals is applied to a delay and alignment network 36b in the second stage and an averaging prefilter 38b in the third stage. The network 36b presents an array of image signals to the transform network 26b for transformation in the second stage (channel 14b). In the averaging prefilter 38b, each of the once-averaged image signals is replaced by an average over the larger neighborhood of once-averaged signals as indicated by the pattern of FIG. 9B. This stream of twice-averaged image signals is applied to a third delay and alignment network 36c, which presents an array of twice-averaged image signals to the transform network 26c for transformation in the third stage (channel 14c).

Each delay and alignment stage 36a, 36b and 36c is so configured as to present an array of particular image signals that are selected (in accordance with the locations a, b, c and d of FIG. 10) for transformation by the 2 by 2 Walsh-Hadamard operators at each stage. That is, in the second stage, the 2 by 2 transform operates on four signals taken from next adjacent signals of next adjacent rows of the once-averaged signals presented by one alignment of the incoming stream of signals. In the third stage, the 2 by 2 transform operates on fourth adjacent signals of fourth adjacent rows of the twice-averaged signals presented to it. In the next alignment of the incoming stream of image signals, new sets of four signals are presented to the respective transform networks. Every image signal therefore enters into four transformation arrays in each stage. As a result of the two stages of averaging, together with the combination of prefiltering with postfiltering or interpolation, a large number of elements of the original image influence the reconstruction of each image element in the processed image.

The transform coefficient signals generated in each of the three stages by the respective direct transform networks 26a, 26b and 26c are presented to respective coefficient modification networks. In the embodiment of FIG. 3, these networks comprise respective clipping circuits 42a, 42b and 42c, each of which have clipping levels chosen according to the expected noise levels as expressed in the coefficient signals conveyed through each of the stages. Coefficient signals less than the clipping levels—representing most of the noise—are passed unaffected to the inverse transform networks 30a, 30b and 30c; coefficient signals greater than the clipping levels—representing most of the image information—are set to zero. The results of the inverse transformation in the inverse transform networks 30a, 30b and 30c constitute sets of four image signal components corresponding to the element locations a, b, c and d shown in FIGS. 10(A), (B) and (C) respectively. These components are presented to respective assembly/averaging networks 44a, 44b and 44c in which the four partial contributions due to block/block overlap in each stage are assembled by properly arranged delay elements and averaged together for each image signal. The averaged image signals (now predominantly noise) from each stage are then presented to the delay, alignment and summing network 48, which provides delays to compensate for the delays incorporated in the respective stages, aligns the image signals and subtracts the image signals (i.e., now predominantly noise signals) produced by all three stages from the unmodified full-band signal presented on the line 40.

Figure 11:
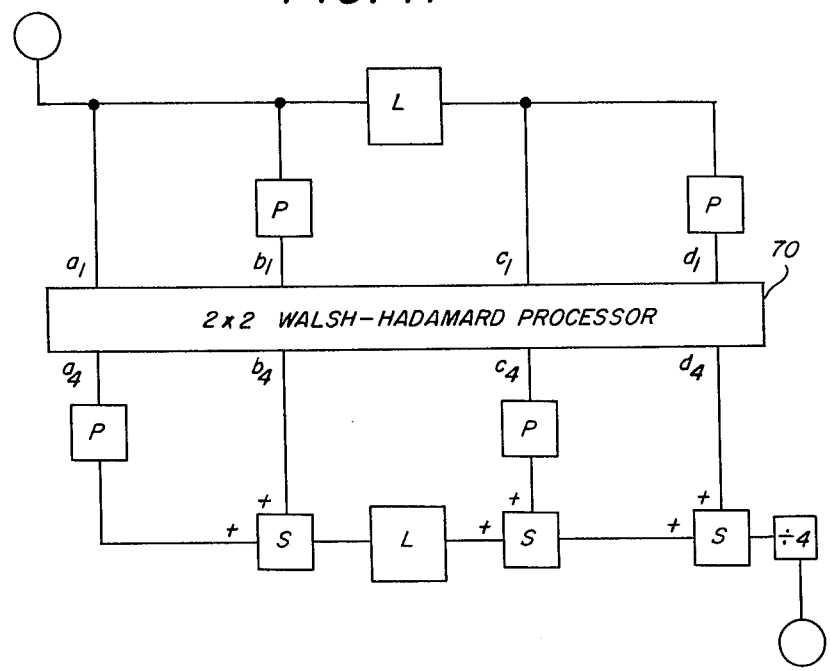
FIG. 11 is a circuit diagram for implementing the first stage filter of FIG. 3.
Figure 12:
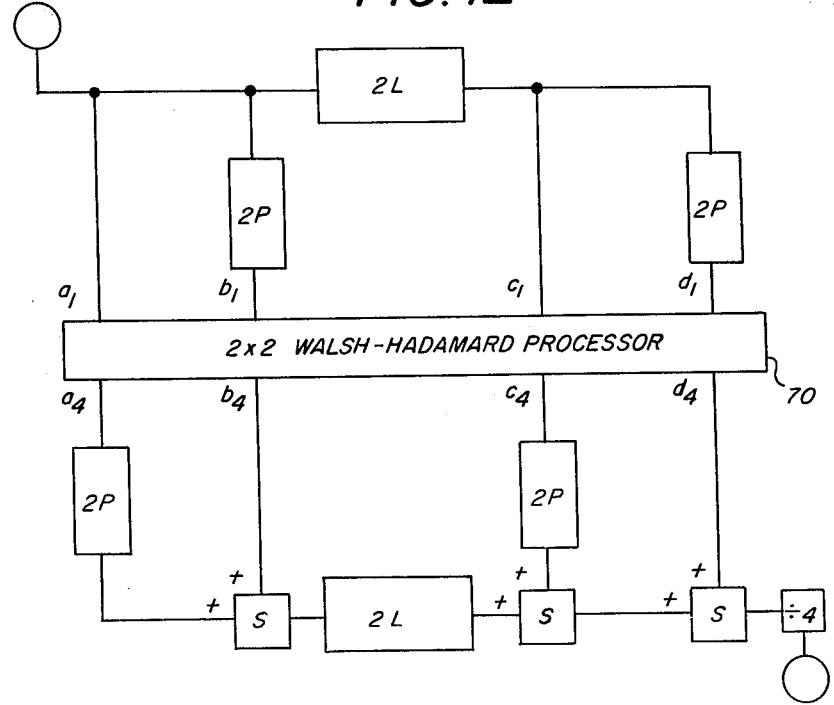
FIG. 12 is a circuit diagram for implementing the second stage filter of FIG. 3.
Figure 13:
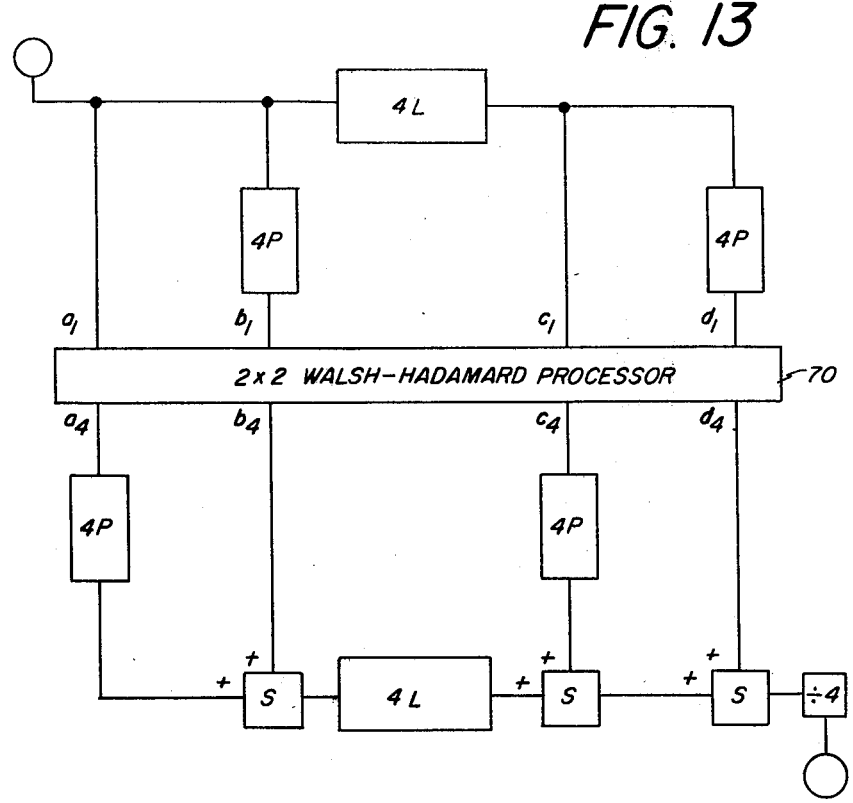
FIG. 13 is a circuit diagram for implementing the third stage filter of FIG. 3.

A hardware implementation of the block overlap transformation method will now be described in relation to FIG. 3. For this reason, portions of the block diagram of FIG. 3 constituting the respective filter stages are enclosed in broken lines. Henceforth, the box 60 will be referred to as the first stage by 2 by 2 Walsh-Hadamard filter, the box 62 as the second stage 2 by 2 Walsh-Hadamard filter, and the box 64 as the third stage 2 by 2 Walsh-Hadamard filter. FIGS. 11, 12 and 13 illustrate a hardware implementation of the respective filter stages—FIG. 11 describing the Walsh-Hadamard filter 60, FIG. 12 describing the Walsh-Hadamard filter 62 and FIG. 13 describing the Walsh-Hadamard filter 64. The averaging prefilters 36a and 38b are provided by the delay and summing elements shown in FIGS. 17 and 18. The delay, alignment and summing network 48 is provided by the delay and summing elements connecting the configuration of inputs shown in FIG. 19.

A number of similar components appear throughout the diagrams of FIGS. 11-19, as follows. Line and element delay units are specified by boxes that are labeled with an "L" and "P" respectively. (Where appropriate, a multiple of "L" or "P" is specified in a single box to indicate a corresponding multiple unit delay.) Summing points are specified by boxes that are labeled with an "S" and the prescribed signs of the inputs are specified by "+" or "−". Scaling operations are specified by boxes that are labeled with the division symbol "÷" followed by the particular divisor (i.e., scaling factor) employed in a specific operation. Moreover, the components for implementing the circuits described by FIGS. 11-19 and 21-25 are commonly obtained through ordinary supply sources. The choice of particular device types is well within the capability of those of ordinary skill in the electronics arts. Further specification is believed unnecessary for practice of the methods in accordance with the invention.

Figure 16:
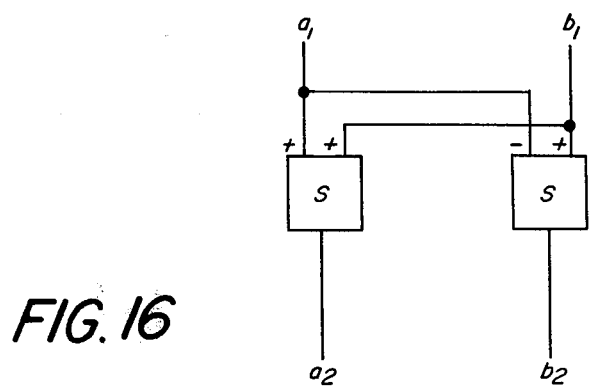
FIG. 16 is a circuit diagram of the components comprising the 1 by 2 transformers which in turn constitute the 2 by 2 transformer of FIG. 15.
Figure 17:
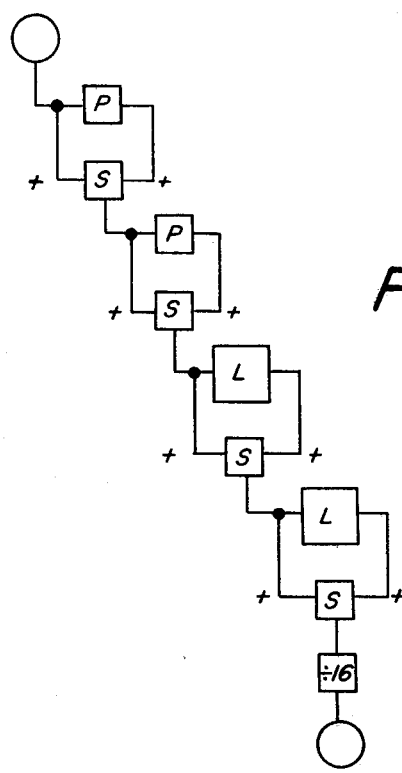
FIGS. 17 and 18 are circuit diagrams of the pair of averaging prefilters utilized in FIG. 3.
Figure 18:
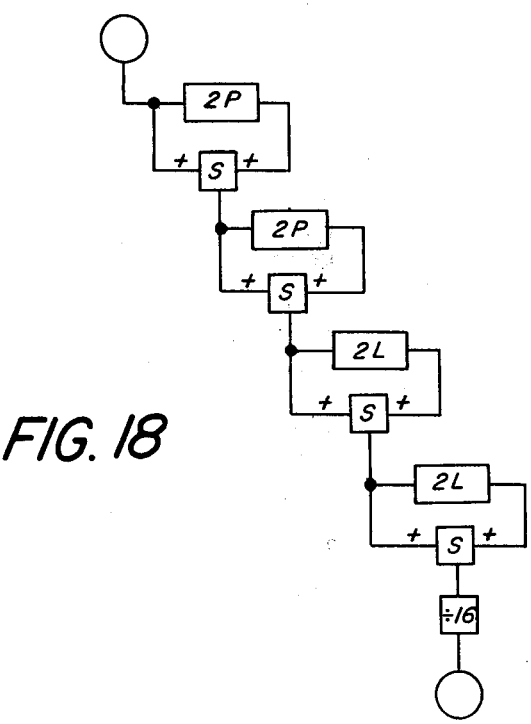

Referring concurrently to FIG. 3 and FIGS. 11-19, the stream of input image signals are presented simultaneously to the first stage 2 by 2 Walsh-Hadamard filter 60 (FIG. 11) and to the second stage averaging prefilter 38a (FIG. 17). The structure of delay and summing units illustrated in FIG. 17 implements the averaging pattern of FIG. 9A. The resultant average is divided by sixteen and delivered to the second stage Walsh-Hadamard filter 62 (FIG. 12) and to the third stage averaging prefilter 38b (FIG. 18). The structure of delay and summing units illustrated in FIG. 18 implements the averaging pattern of FIG. 9B. The resultant average is then divided by sixteen and delivered to the third stage Walsh-Hadamard filter 64 (FIG. 13).

Figure 14:
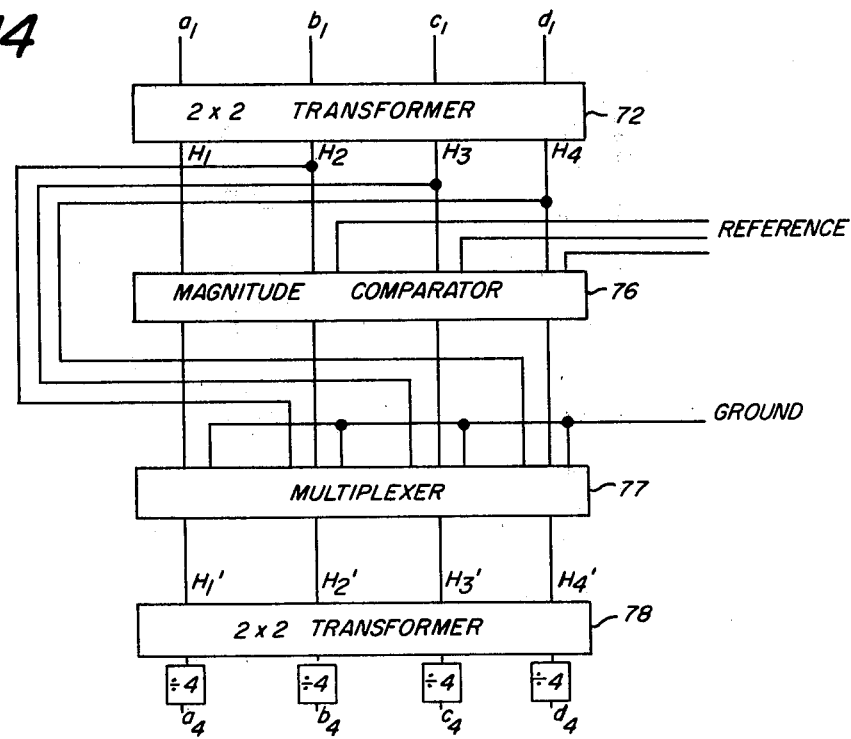
FIG. 14 is a circuit diagram of the Walsh-Hadamard processor incorporated in FIGS. 11, 12 and 13.
Figure 15:
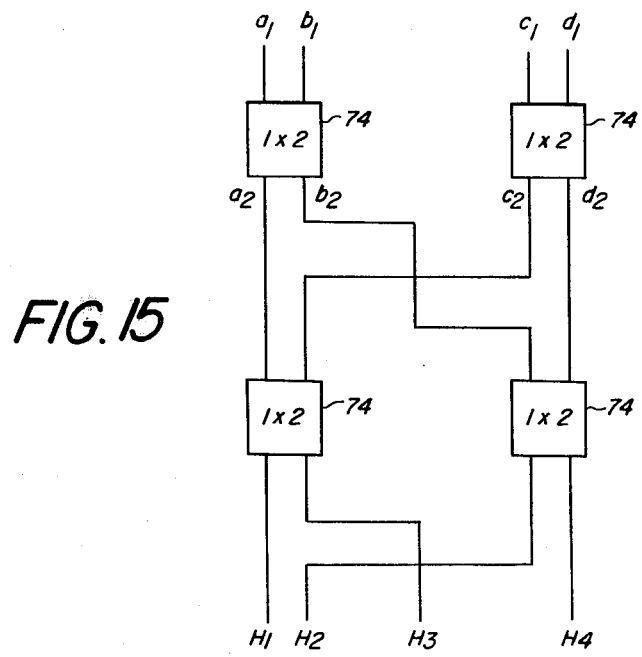
FIG. 15 is a circuit diagram of the 2 by 2 transforms incorporated in FIG. 14.

Each Walsh-Hadamard filter (FIGS. 11-13) includes a 2 by 2 Walsh-Hadamard processor 70, which is shown in greater detail in FIG. 14. With reference to the components of FIG. 3, each processor 70 includes (1) the direct transform network 26a, 26b or 26c (also shown as a 2 by 2 transformer 72 in FIG. 14) (2) the clipping circuits 42a, 42b and 42c (also shown as a magnitude comparator 76 and a multiplexer 77 in FIG. 14) and (3) the inverse transform network 30a, 30b or 30c (also shown as a 2 by 2 transformer 78 in FIG. 14). The network of delay units preceding the Walsh-Hadamard processor 70 in each of the diagrams of FIGS. 11-13 corresponds to the respective delay and alignment network 36a, 36b or 36c utilized in the respective stages of the apparatus of FIG. 3. These delay units generate four image signals a, b, c, and d, corresponding to the four image element locations a, b, c and d selected for the Walsh-Hadamard transformation at each stage (as shown by FIGS. 10(A), 10(B) and 10(C)). The network of delay and summing units following the Walsh-Hadamard processor 70 in each of the diagrams of FIGS. 11-13 corresponds to the respective assembly and averaging network 44a, 44b or 44c shown in FIG. 3.

Turning next to FIG. 14 for a detailed diagram of the 2 by 2 Walsh-Hadamard processor 70, the four input image signals $a_1$, $b_1$, $c_1$, and $d_1$, are presented to the 2 by 2 transformer 72, which performs a Walsh-Hadamard transform on the input signals and generates the four transform coefficient signals H1, H2, H3 and H4. The calculations required for the Walsh-Hadamard operations are implemented by a set of 1 by 2 Walsh-Hadamard transformers 74 shown in FIG. 15, each of which is composed of a summing network shown in FIG. 16. Three of the coefficient signals H2, H3 and H4—are compared to respective references in the magnitude comparator 76. If any of the coefficient signals have a value exceeding the corresponding reference, a bit is set to the multiplexer 77 causing the multiplexer 77 to set the corresponding coefficient to ground (zero). If the value is less than the corresponding reference, the input coefficient signal is switched to the 2 by 2 transformer 78 without change. In the case of a "core and add" system, any input coefficient signal greater than its corresponding reference would be switched to the transformer 78, the others set to ground (zero) and the H1 coefficient signal—representing an average of the input image signals—would either be presented to the next stage (as in the first two stages of FIG. 2) or directly to the 2 by 2 transformer 78 (as in the third stage of FIG. 2). In the embodiment of FIG. 3, which is a "clip and subtract" system, the H1 signal input to transformer 78 is set to zero. For the Walsh-Hadamard inverse transform, the 2 by 2 transformer 78 is constructed the same as the 2 by 2 transformer 72 with the inputs now being the modified coefficient signals H1', H2', H3', and H4'. The transformer 78 performs the inverse Walsh-Hadamard transform and, after division by a scaling factor of four, generates four modified image signals $a_4$, $b_4$, $c_4$ and $d_4$.

These modified image signals are then presented to the respective network of delays and summing units following the processor 70 of FIGS. 11, 12, or 13. In these networks, the four partial contributions due to block/block overlap are assembled by the arranged delay elements and averaged together for each image signal. Streams of such averaged image signals are then presented to the respective ports of the delay, alignment and summing network of FIG. 19. This network provides delays to compensate for the delays incorporated in the respective stages, and aligns and subtracts the signals produced by the three stages from the unmodified full-band signal presented at the port 48a from the line 40.

As the invention pertains to the multi-stage arrangement and to the overlapping aspect of a block transform method of noise reduction, the particular type or combination of transforms utilized is not crucial to the practice of the invention. Nonetheless, certain types or combinations of transforms appear to render certain spatial components in the processed image differently than other types or combinations of transforms would render such components. Whether such a renditon by one type or combination of transform is 'better' than another depends on the overall advantages and disadvantages of using a particular transform(s) in view of the specific result that is most desired in the processed image. For example, in reference to FIG. 4, there is illustrated a block diagram of an overlapped block transform method carried out in two stages in accordance with a third embodiment of the invention. The first stage uses a 4 by 4 slant transform and the second stage uses a 2 by 2 Walsh-Hadamard transform. It is believed that the combination of transforms used in this third embodiment may possess some advantage over the embodiment of FIG. 3 in the rendition of modeling, whereas the combination of transforms used in the embodiment of FIG. 3 appears to have some advantage in the rendition of edges.

Figures 19, 20:
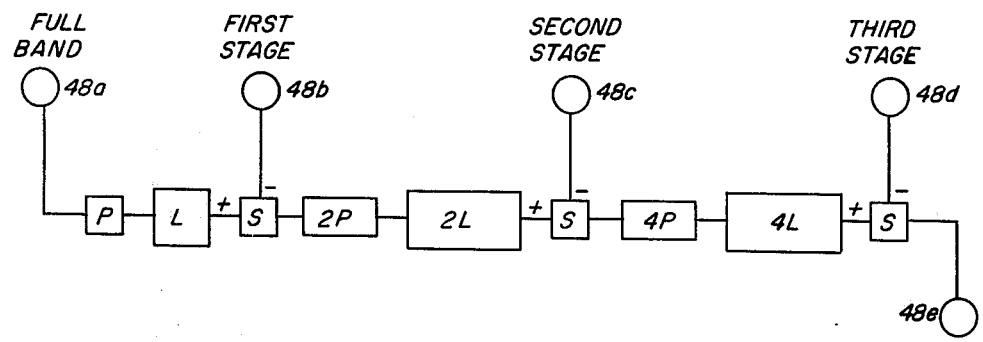
FIG. 19 is a circuit diagram of the delay, alignment and summing network utilized in FIG. 3.
FIG. 20 is a diagram illustrating the 4 by 4 configuration of image elements processed by the filter of FIG. 21.

As in the embodiment of FIG. 3, FIG. 4 incorporates a clipping and subtracting mode of noise isolation and signal recombination. Moreover several of the components of the embodiment of FIG. 3 are retained in the embodiment of FIG. 4. The incoming sequence of image signals (representing the full-band image signal) is passed without modification on a line 100 to the input port 48a of the delay, alignment and summing network 48. The image-related higher frequency portions of the signal are transformed and clipped in a 4 by 4 slant filter 102 in the first stage and in the 2 by 2 Walsh-Hadamard filter 64 in the second stage. The clipped results are inverse transformed and presented to assembly/averaging networks—included in the filters 64 and 102—where the partial contributions due to block/block overlap are assembled and averaged together for each image signal. The resulting low amplitude, high frequency signals—consisting of averaged image signals mainly representative of noise—are connected to the input ports 48c and 48d of the delay, alignment and summing network 48. FIG. 20 illustrates the 4 by 4 configuration of image elements processed by the 4 by 4 slant filter 102. The 2 by 2 Walsh-Hadamard filter 64 processes the configuration of image elements illustrated in FIG. 10(C) (third stage). A smoothed version of the original image is provided in the second stage by an averaging prefilter 104.

Figure 21:
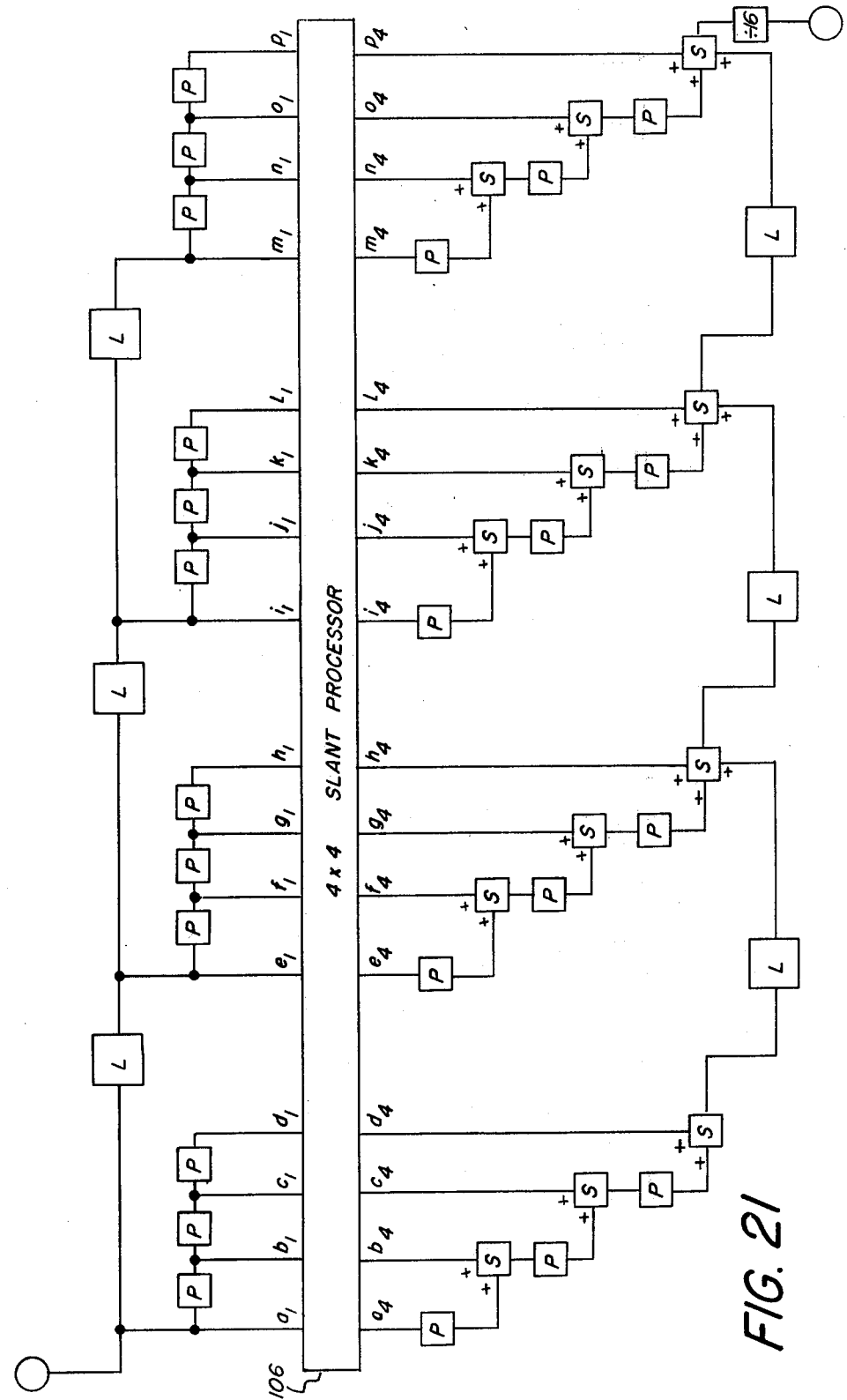
FIG. 21 is a circuit diagram for implementing the first stage filter of FIG. 4.
Figure 22:
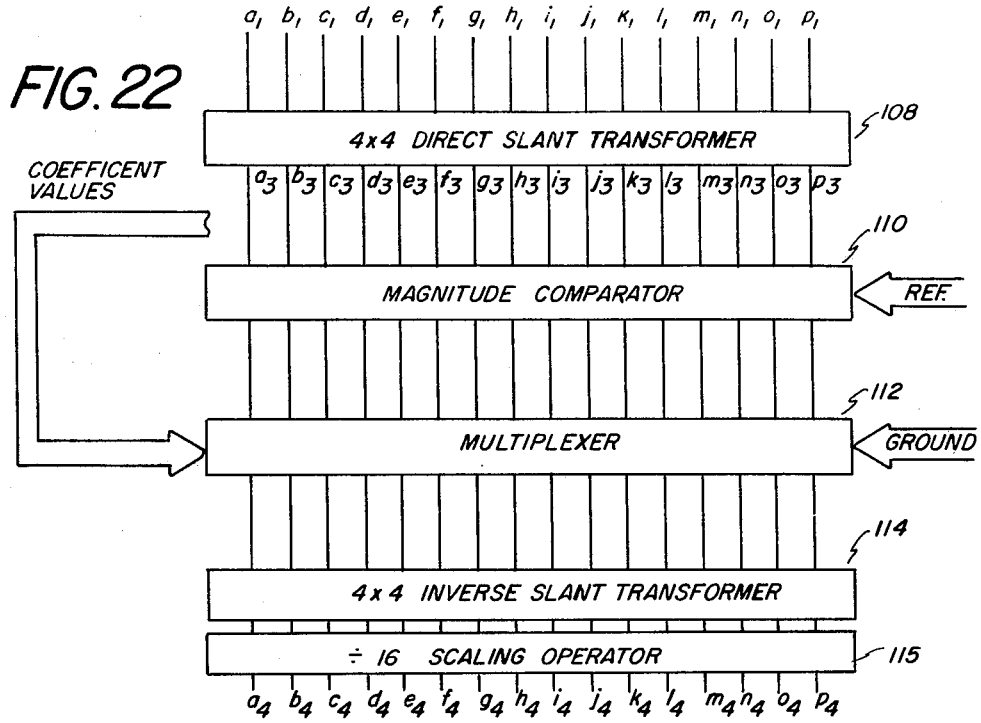
FIG. 22 is a circuit diagram of the slant processor incoporated in FIG. 21.

An assemblage of components illustrated in FIGS. 13-19 and 21-25 constitute a hardware implementation of the block diagram of FIG. 4, as follows. The first stage 4 by 4 slant filter 102 is illustrated in FIG. 21 as composed of a series of delays and summing junctions and a 4 by 4 slant processor 106. The slant processor 106 includes the components of FIG. 22: a 4 by 4 direct slant transformer 108, a magnitude comparator 110, a multiplexer 112, a 4 by 4 inverse slant transformer 114, and a divide by sixteen scaling operator 115 for each coefficient. The 4 by 4 slant transformer 108 is further described in FIG. 23 as comprising an interconnected group of 1 by 4 direct slant transformers 116, each of which is further illustrated in FIG. 24. There it is shown how the 1 by 4 slant transform is obtained from four 1 by 2 Walsh-Hadamard transformers 118 by a combination of arithmetic operations. The 1 by 2 Walsh-Hadamard transformer 118 is shown in FIG. 16 in its basic form of summers and dividers. The averaging prefilter 104 is the concatenation of the elements of FIGS. 17 and 18, i.e., the output of the elements of FIG. 17 is joined to the input of the elements of FIG. 18. The 2 by 2 Walsh-Hadamard filter in the second stage of FIG. 4 is the same filter as illustrated by FIG. 13 and includes the assemblage of components heretofore described in connection with FIGS. 14-16.

Figure 23:
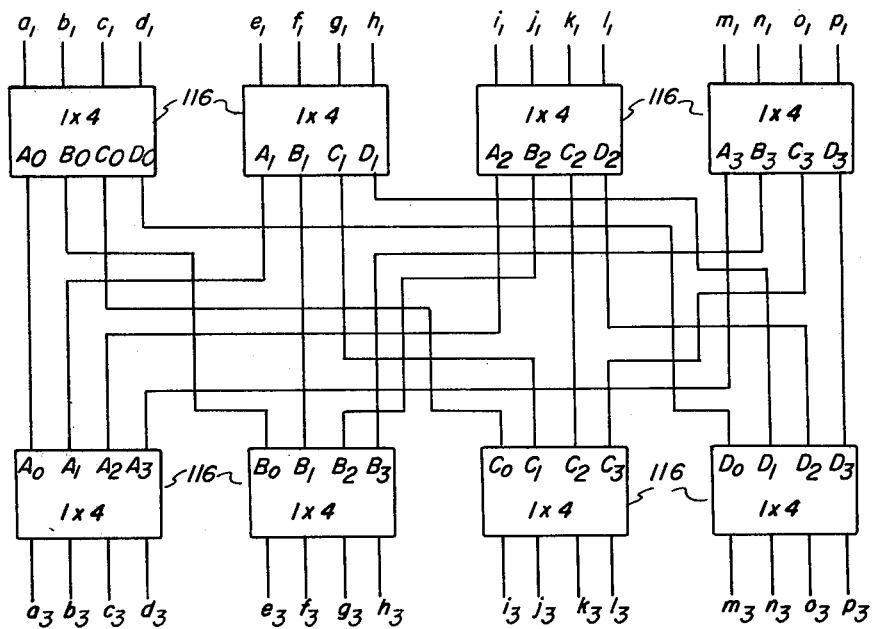
FIG. 23 is a circuit diagram of a configuration of 1 by 4 transformers for implementing the direct slant transformer of FIG. 22.
Figure 24:
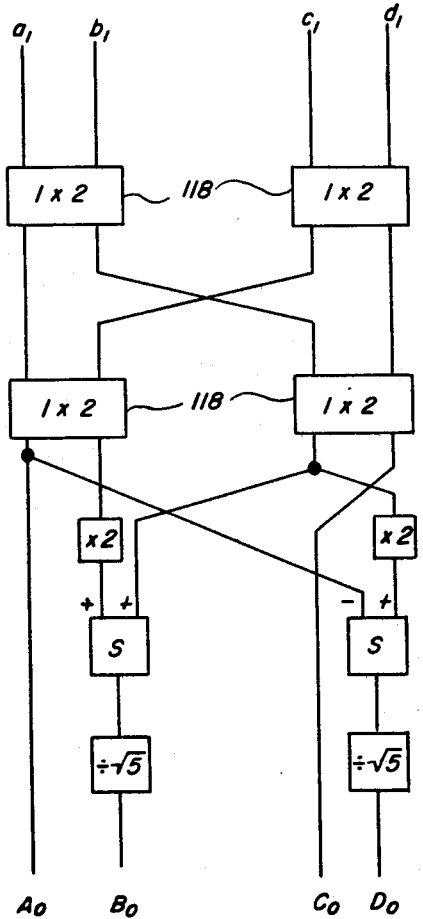
FIG. 24 is a circuit diagram of components for implementing each 1 by 4 transformer described in FIG. 23.

In operation, a stream of input image signals is presented simultaneously to the first stage 4 by 4 slant filter 102 and to the second stage averaging prefilter 104. In the first stage, the configuration of delay units on the input side of the 4 by 4 slant processor 106 (FIG. 21) orders the input signals into the array depicted by FIG. 20. These sixteen input image signals $a_1 \ldots p_1$ are presented to the 4 by 4 slant transformer 108, which performs a slant transform on the input signals and generates sixteen transform coefficient signals $a_3 \ldots p_3$. The slant transformers 108 employs a battery of 1 by 4 slant transformers 116 (FIG. 23). The schematic for a single 1 by 4 slant transformer operating on the first four image signals $a_1 \ldots d_1$ is shown in FIG. 24, together with its derivation from the 1 by 2 Walsh-Hadmard transformer 118 (as shown in FIG. 16). The other 1 by 4 slant transformers of FIG. 23 are the same excepting the respective input and output lines.

Figure 25:
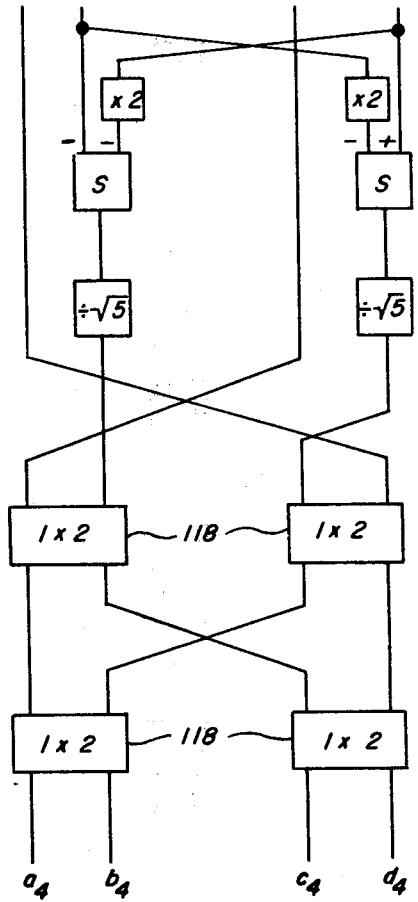
FIG. 25 is a circuit diagram of components for implementing a 1 by 4 inverse slant transformer useful in constructing the 4×4 inverse slant transformer illustrated in FIG. 22.

Fifteen of the slant transform coefficient signals-$b_3 \ldots p_3$-are compared to respective references in the magnitude comparator 110. If any of the coefficient signals have a value exceeding the corresponding reference, a bit is set to the multiplexer 112 causing the multiplexer 112 to set the corresponding coefficient signal to ground (zero). Otherwise the input coefficient signals are switched to the 4 by 4 inverse slant transformer 114 without change. This being a 'clip and subtract' implementation, the coefficient $a_3$ representing the average or low pass signal is set to zero. The 4 by 4 inverse slant transformer 114 employs a battery of 1 by 4 slant transformers as shown in FIG. 23, except that each 1 by 4 direct transformer 116 is replaced by the 1 by 4 inverse slant transformer illustrated in FIG. 25. Four 1 by 2 Walsh-Hadamard transformers 118 (FIG. 16) and the appropriate arithmetic operations are shown by FIG. 25 for a single 1 by 4 inverse slant transformer. Alternatively, it is noted that the inverse slant transformer of a block-overlapped transform method is the same, with the exception of sign, as the direct slant transform. Thus the 4×4 inverse slant transformer 114 may be structured the same as that of the 4 by 4 direct slant transformer 108, if sign is taken into account. The clipped image signals are then divided by sixteen and presented to the network of delay and summing units following the processor 106 of FIG. 21. In this network, sixteen partial contributions due to block/block overlap are asssembled by the arranged delay elements and averaged together for each image signal.

Turning now to the second stage of FIG. 4, the averaging prefilter 104 implements the concatenation of the averaging patterns of FIGS. 9A and 9B for the stream of input image signals. This is done by concatenating the second and third stage prefilters illustrated in FIGS. 17 and 18 in connection with FIG. 3. As the second stage 2 by 2 Walsh-Hadamard filter 64 of FIG. 4 is the same as the third stage Walsh-Hadamard filter 64 of FIG. 3, reference is made to the description accompanying the third stage Walsh-Hadamard filter of FIG. 13 for a complete description of the components comprising the filter.

The averaged signals (now predominantly noise) from each stage of FIG. 4 are now presented to the delay, alignment and summing network 48, which provides delays to compensate for the delays incorporated in the respective stages, and aligns and substracts the signals produced by the two stages from the unmodified full-band signal presented on the line 100. The configuration of delay and summing elements diagrammed in FIG. 19 provides the necessary delay, alignment and summing required by the network 48 of FIG. 4 if the full band signal is connected to the input port 48a, the output of the 4 by 4 slant filter 102 is connected to the input port 48c and the output of the second stage 2 by 2 Walsh-Hadamard filter 64 is connected to the input port 48d. In using the network of FIG. 19 for the network 48 of FIG. 4, the input port 48b is left unconnected.

The invention has been described in detail with particular reference to presently preferred embodiments thereof, but it will be understood that variations and modifications can be effected within the spirit and scope of the invention. For example, it should be understood that the described methods in accordance with the invention may be practiced by suitable programming of a digital computer. Such programming is entirely conventional and within the capability of one of ordinarily skill in the programming arts.

What is claimed is:

1. A method of processing an original image in order to generate a processed image having fewer unwanted components than the original image, said method comprising the steps of
   A. generating image signals related to the brightness of respective elements of the original image;
   B. grouping the image signals into arrays of image signals corresponding to overlapping blocks of image elements, wherein each block includes at least one image element in common with at least one other block;
   C. processing the arrays in a hierarchy of separate stages in which the image signals generated for each stage subsequent to the first represent derived signals responsive to combinations of large signals from a preceding stage, each stage comprising the steps of
      (1) transforming each array of image signals by a set of independent functions into a corresponding set of coefficient signals representing combinations of image signals sensitive to general brightness and image detail, and
      (2) subjecting the coefficient signals to modification in order to minimize the unwanted components in the processed image; and
   D. generating a processed image from the sets of coefficient signals, some of which may be modified, whereby the processed image is generated without a characteristic block-like structure due to block transform processing while the wanted components of the image are rendered with minimal image loss or distortion.

2. A method of processing an original image in order to generate a processed image having fewer unwanted components than the original image, said method comprising the steps of
   A. generating image signals related to the brightness of respective elements of the original image;
   B. grouping the image signals into image signal arrays having at least one mutually common signal and corresponding to similarly overlapping blocks of image elements, wherein each block includes at least one image element in common with at least one other block;
   C. transforming each array of image signals by a set of independent functions into a corresponding set of coefficient signals representing combinations of image signals sensitive to general brightness and image detail;
   D. subjecting the sets of coefficient signals to modification in order to minimize the unwanted components in the processed image;
   E. performing the foregoing steps (A) to (D) in a hierarchy of separate stages in which the image signals generated for each stage subsequent to the first comprise derived signals corresponding to combinations of image signals sensitive to the brightness of image signals processed in a preceding stage; and
   F. generating a processed image from the sets of coefficient signals, some of which may be modified, whereby the block-like structure characteristic of block transform processing is minimized in the processed image and the rendition of the wanted components of the image is improved with minimal image loss or distortion.

3. A method of block transform processing of a sampled image composed of image elements in order to generate processed image signals having fewer noise components and fewer visible artifacts introduced by the processing method, said method comprising the steps of
   A. generating image signals related to the brightness of respective image elements;
   B. grouping the image signals into arrays of image signals corresponding to blocks of image elements;
   C. aligning the arrays of image signals such that each array includes at least one image signal in common with at least one other array whereby the aligned arrays correspond to overlapping blocks of image elements;
   D. transforming each array of image signals by a set of independent functions into a corresponding set of coefficient signals representing (1) a general brightness within each block and (2) one or more estimations of spatial variations of brightness representative of noise components and image detail within each block;
   E. modifying at least some of the sets of coefficient signals by (1) selecting certain coefficient signals by comparison to a threshold and (2) altering these selected coefficient signals;
   F. performing the foregoing steps (A) to (E) in a hierarchy of separate stages in which the image signals generated for each stage subsequent to the first comprise signals derived from combinations of image signals sensitive to the general brightness of the image signals processed in a preceding stage; and
   G. generating processed image signals from the sets of coefficient signals, some of which are modified, whereby noise components are reduced in the processed image without generating the block-like structure characteristic of block transform processing, image detail is rendered with little image loss or distortion and the unwanted artifacts of processing are reduced.

4. The method as claimed in claim 3 in which the step of modifying at least some of the sets of coefficient signals comprises the steps of
   A. determining one or more thresholds that represent one or more coefficient magnitudes of such values that greater coefficient magnitudes rarely occur due to noise alone;
   B. selecting corresponding coefficient signals that are less than the said one or more thresholds; and
   C. altering these selected coefficient signals by reducing their values.

5. The method as claimed in claim 3 in which

A. the step of generating the image signals additionally comprises generating a full-band image signal composed of image signals that are not grouped into arrays or applied to the hierarchy of stages;
B. the step of modifying at least some of the sets of coefficient signals comprises the steps of
   (1) determining one of more thresholds that represent one or more coefficient magnitudes of such values that greater coefficient magnitudes rarely occur due to noise alone;
   (2) selecting corresponding coefficient signals that are greater than the said one or more thresholds, and
   (3) altering these selected coefficient signals by reducing their values; and
C. the step of generating processed image signals comprises generating noise signals from the sets of coefficient signals, some of which are modified, and subtracting the noise signals from the full-band image signal.

6. A method of transform processing of image signals related to the brightness of respective elements of a sampled image composed of a plurality of such image elements, said method comprising the steps of
A. processing the image signals in two or more separate stages, wherein the first stage comprises the steps of
   (1) grouping the image signals into arrays of image signals corresponding to blocks of image elements,
   (2) aligning the arrays of image signals such that some of the image signals are included in more than one array, whereby the aligned arrays correspond to overlapped blocks of image elements,
   (3) transforming each array of image signals by a set of independent functions into a corresponding set of coefficient signals representing (a) an average brightness within each block and (b) one or more estimations of spatial variations of brightness representative of noise and image detail within each block,
   (4) modifying at least some of the sets of coefficient signals by (a) selecting certain coefficient signals by comparison to a threshold and (b) altering these selected coefficient signals, wherein the subsequent stages comprise the steps of
   (1) generating derived image signals from combinations of image signals representative of the brightness within localized areas of the image processed in the preceding stage,
   (2) grouping the derived image signals into arrays of derived image signals corresponding to blocks of derived image elements,
   (3) aligning the arrays of derived image signals such that some of the derived image signals are included in more than one array, whereby the aligned arrays correspond to overlapped blocks of derived image elements,
   (4) transforming each array of derived image signals by a set of independent functions into a corresponding set of derived coefficient signals representing (a) an average brightness within each block of derived image elements and (b) one or more estimations of spatial variations of brightness representative of noise and image detail within each block of derived image elements,
   (5) modifying at least some of the sets of derived coefficient signals by (a) selecting certain derived coefficients by comparison to a threshold and (b) altering these selected coefficient signals;
B. generating a processed image from the sets of coefficient signals processed in each of the stages, whereby noise is reduced without generating the block-like structure characteristic of block transform processing and image detail is rendered with little image loss or distortion.

7. The method as claimed in claim 6 in which the step of generating derived image signals comprises using the coefficient signals representing the average brightness within the blocks of the preceding stage as the derived image signals.

8. The method as claimed in claim 6 in which the step of generating derived image signals comprises filtering the image signals processed in the preceding stage to provide filtered image signals representing a general brightness of the image signals processed in the preceding stage.

* * * * *

UNITED STATES PATENT OFFICE
CERTIFICATE OF CORRECTION

PATENT NO. : 4,442,454

DATED : April 10, 1984

INVENTOR(S) : Philip G. Powell

It is certified that error appears in the above-identified patent and that said Letters Patent are hereby corrected as shown below:

Column 1, line 31, delete "whenever" and insert --wherever-- in its place.

Column 2, line 11, delete "faacilitates" and insert --facilitates-- in its place.

Column 2, line 37, delete "unchaanged" and insert --unchanged-- in its place.

Column 3, line 44, delete "depending" and insert --depends-- in its place.

Column 9, line 10, delete "All" and insert --An-- in its place.

Column 13, line 12, delete "36a" and insert --38a-- in its place.

Column 17, line 31, delete "large" and insert --image-- in its place.

Column 18, line 42, delete "foreging" and insert --foregoing-- in its place.

UNITED STATES PATENT AND TRADEMARK OFFICE
CERTIFICATE OF CORRECTION

PATENT NO. : 4,442,454

DATED : April 10, 1984

INVENTOR(S) : Philip G. Powell

It is certified that error appears in the above-identified patent and that said Letters Patent is hereby corrected as shown below:

Column 5, line 36, delete "transforms" and insert --transformers-- in its place.

Signed and Sealed this

Eleventh Day of September 1984

[SEAL]

Attest:

GERALD J. MOSSINGHOFF

Attesting Officer     Commissioner of Patents and Trademarks